United States Patent

Bowsky et al.

[11] Patent Number: 5,383,338
[45] Date of Patent: Jan. 24, 1995

[54] IN-LINE SIGHT INDICATOR

[75] Inventors: Benjamin Bowsky; George J. Sciuto, both of St. Louis, Mo.

[73] Assignee: Emerson Electric Co., St. Louis, Mo.

[21] Appl. No.: 168,234

[22] Filed: Dec. 17, 1993

[51] Int. Cl.⁶ ............................................. F25B 49/00
[52] U.S. Cl. ............................... 62/125; 73/323;
   116/206; 116/276; 137/559; 165/11.1
[58] Field of Search .......... 62/125; 165/11.1;
   116/206, 276; 73/323, 330; 137/559

[56] References Cited

U.S. PATENT DOCUMENTS

| | | | |
|---|---|---|---|
| 2,761,312 | 5/1956 | Line et al. | 73/53 |
| 2,836,974 | 11/1956 | Krause | 73/53 |
| 3,874,323 | 4/1975 | Rottig | 62/125 |
| 4,195,058 | 3/1980 | Patel | 116/206 |
| 4,474,034 | 10/1984 | Avery, Jr. | 62/125 |
| 4,730,465 | 3/1988 | Inoue | 62/125 |
| 4,788,151 | 11/1988 | Preziosi et al. | 116/206 |
| 5,127,433 | 7/1992 | Argyle et al. | 116/206 |
| 5,247,813 | 9/1993 | Bottum | 62/125 |

Primary Examiner—Ronald C. Capossela
Attorney, Agent, or Firm—Polster, Lieder, Woodruff & Lucchesi

[57] ABSTRACT

An in-line sight indicator structure for a fluid system wherein a chamber defining flow-through sight housing includes a sight glass in one wall portion thereof and a support member extending from an opposite wall portion in spaced relation to the sight glass to support an indicator element mounted thereon within a fluid stream passed through the chamber, the housing being hermetically sealed from ambient.

11 Claims, 3 Drawing Sheets

IN-LINE SIGHT INDICATOR

BACKGROUND OF THE INVENTION

The present invention relates to sight gages and more particularly to an in-line sight indicator assembly for indicating the levels of dryness and excessive quantities of water in a refrigerant system and the presence of refrigerant.

Various types of indicators have been used in the past wherein an indicating element responds by color change to the presence of water in a predetermined range within a refrigerant system, attention being directed for example to long since expired U.S. Pat. Nos. 2,761,312, issued to Richard A. Line et al on Sep. 4, 1956 and 2,836,974, issued to Waiter O. Krause on Jun. 3, 1958. In these patents, the color and the color intensity change in response to the relative saturation of water in a liquid above or below a predetermined range level with the color change being reversible in response to reverse relative saturations. In addition various in-line sight indicator housing assemblies have been utilized to house the color responding indicator elements. For the most part, these in-line sight indicator housing assemblies have supported the color responding indicator element at a position above the flow axis of the fluid stream to be examined with the indicator element being substantially against the sight glass. Moreover, the housing assembly structures of the past usually have included a number of parts, being comparatively complex and expensive in manufacture and assembly and being occasionally prone to fluid and/or gas leakage at the various junctures of the several parts of the assembly. In FIG. 3 of the drawings described herein below, one such assembly similar to that sold by AMI of ALCO Controls Division, Emerson Electric Co., St. Louis, Mo. includes an internally threaded housing having an in-line flow cavity internally threaded and recessed to receive an externally threaded sleeve having a sight glass disposed therein with a spring-like legged spider member support which, in turn, is supported by the leg extremities nesting in an internal groove in the sleeve. The spring-like legged spider member has an indicator element receiving cup mounted at the apex, the spider member serving to urge the indicator element toward the inner face of the sight glass. In FIG. 4 of the hereinbelow described drawing, a housing assembly structure similar to those sold by the Sporlan Company of St. Louis, Mo. and the Superior Valve Co. of Washington, Pa. is shown as including an externally threaded male carrier post threadably engageable with an internally threaded aperture in a housing member having a flow-through cavity, the male carrier post, in turn nesting with a hollow female sleeve having an indicator element mounted at one end thereof which indicator element can be urged toward the inner face of a sight glass mounted in the housing wall opposite the internally threaded post receiving aperture. In FIG. 5 of the hereinbelow described drawings, a housing assembly structure similar to that sold by the Henry Valve Co. of Melrose Park, Ill. is shown as including an externally threaded nipple on a flow-through housing, the nipple serving to threadedly receive an internally threaded sleeve which has a sight glass mounted therein and is so hollowed to receive a color changing disc-like indicator ring sandwiched between a pair of gaskets with the sandwiched disc-like indicator ring being positioned substantially adjacent the inner face of the sight glass when the several disclosed parts are assembled.

From the above descriptions of the prior art, it readily can be seen that previous in-line sight indicators have included several comparatively complex and expensive to manufacture and assemble parts which have been prone to fluid leakage at the parts junctures and which have supported the indicator elements in spaced relation to the flow axis of the fluid stream to be observed.

The present invention provides an in-line sight indicator assembly which requires a minimum of parts, which is comparatively straight forward and inexpensive to manufacture and assemble, which is hermetically sealed to be comparatively free of fluid leakage and which has an indicator element positioned adjacent the flow axis of the fluid stream to be sampled to give a more accurate condition indicator.

Various other features of the present invention will become obvious to one skilled in the art upon reading the disclosure set forth herein.

BRIEF DESCRIPTION OF THE INVENTION

More particularly the present invention provides an in-line sight indicator for a fluid stream comprising: an indicator housing having a chamber with spaced flow inlet and outlet passages communicating therewith, each of the passages being connected to a fluid conduit, visually transparent sight means disposed in the wall of the housing; an indicator element support member disposed and positioned in the housing chamber to support an indicator element in the housing in spaced relation from the sight means to be substantially in line with the flow of a fluid stream flowing from the inlet to the spaced outlet passage; and, an indicator element mounted on the support member, the indicator element being chemically responsive to a fluid in the fluid system to provide a visible color change in the event of a preselected change in the fluid in the fluid system. In addition, the present invention provides an indicator housing assembly with a minimum of parts so configured with the spacing of certain elements within the housing to allow ready hermetic sealing of the housing to ambient.

It is to be understood that various changes can be made by one skilled in the art in the novel indicator structure disclosed herein without departing from the scope or spirit of the present invention.

BRIEF DESCRIPTION OF THE DRAWINGS

Referring to the drawings which discloses one advantageous embodiment of the present invention and several structural embodiments of the prior art.

DETAILED DESCRIPTION OF THE INVENTION

Figure 3:
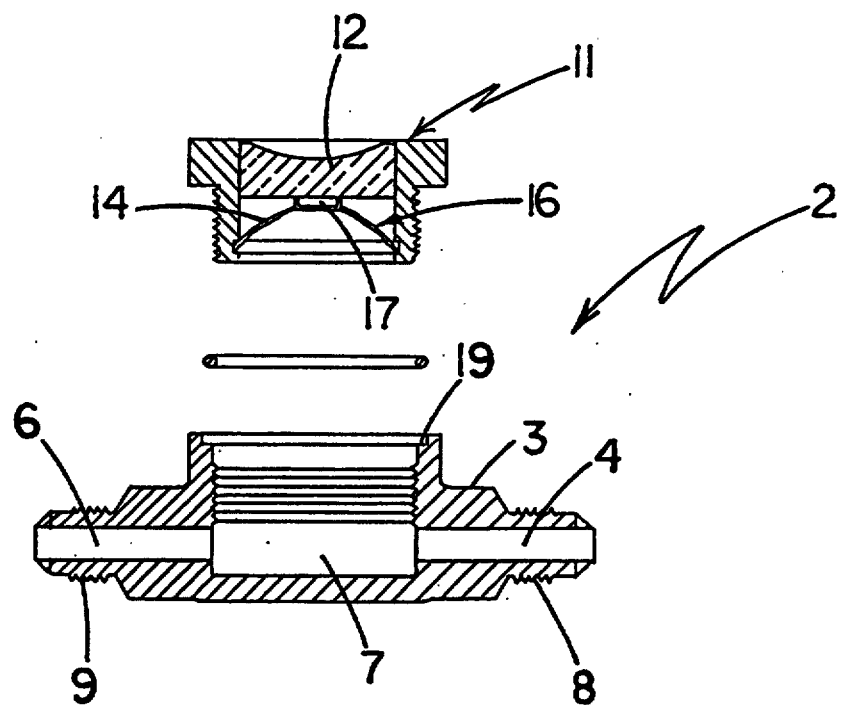
FIGS. 3 to 5 are exploded cross-sectional side views of three prior art embodiments respectively of three types of prior art sight indicator structures.

As can be seen in FIG. 3 of the drawings, one prior art sight indicator 2 sold by Alco Controls as an AMI indicator is shown, such indicator including a longitudinally extending housing 3 having spaced, opposed internal inlet and outlet passages 4 and 6 respectively communicating with an in-line flow cavity or chamber 7 therebetween. Housing 3 is provided with opposed, passages surrounding, externally threaded nipples 8 and 9 to be connectable in-line to internally threaded conduit ends (not shown). In accordance with the prior art embodiment of FIG. 3, chamber 7 is internally threaded to threadedly receive an externally threaded sleeve 11. A sight glass 12 is sealed or bonded into the internal bore of sleeve 11, which internal also is provided with an internal peripheral groove 13. Groove 13 serves to receive the ends of spring-like legs 14 of spider support member 16. Three or more thin, separate, spring-like legs 14 can be provided (not shown), the legs terminating at an apex in an indicator element receiving cup 17 which can be part of spider 16. In this disclosed arrangement, cup 17 receives a color changeable indicator element to urge the same away from the fluid axis line of flow toward and proximate the inner face of glass 12 for observation. A suitable sealing gasket 18 surrounds sleeve 11 to seat in a recess 19 above the line of fluid flow.

Figure 4:
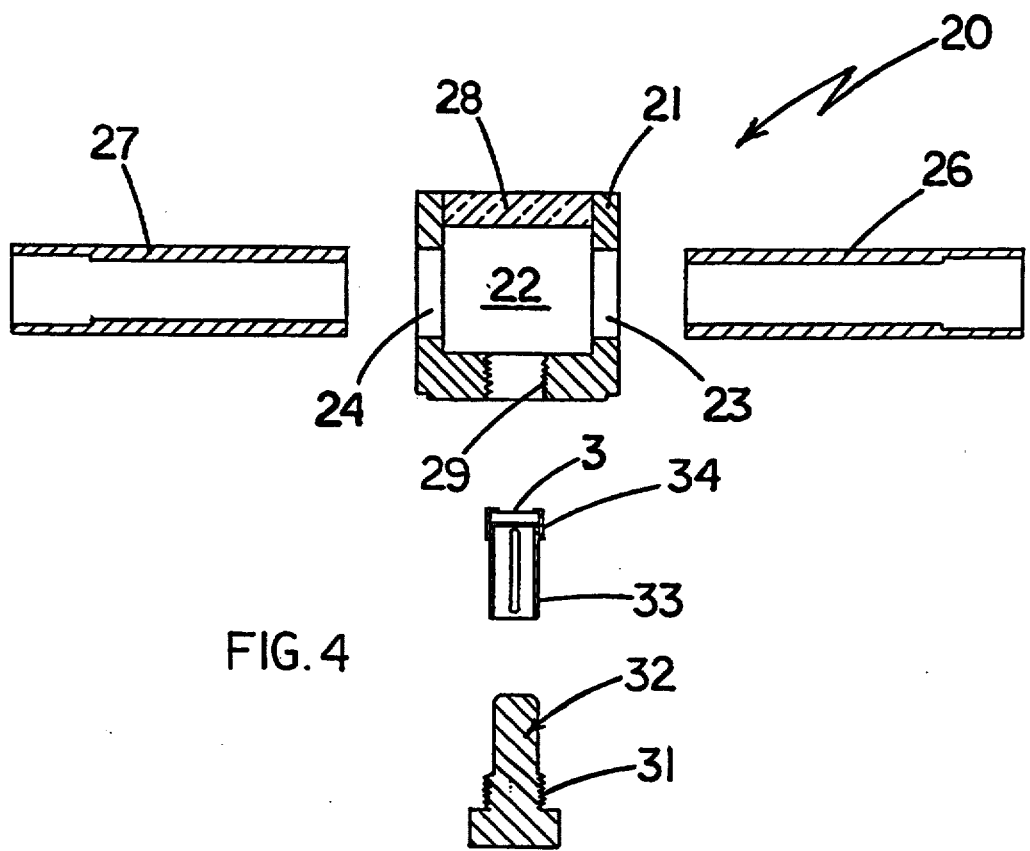

In FIG. 4, another prior art housing assembly structure 20 of a prior art in-line sight indicator is disclosed in exploded form. The embodiment 6f FIG. 4 is similar to the structures sold by the Sporlan Company of St. Louis and the Superior Valve Co., Washington, Pa. This structure includes a housing 21 defining a chamber 22 having spaced opposed inlet and outlet passages 23 and 24. Suitable conduits 26 and 27 are connected to passages 23 and 24 respectively to provide for an in-line passage of fluid through chamber 22. Positioned in one portion of the wall housing 22 above the axis of fluid flow is a sight glass 28 and positioned in a directly opposite portion of housing 22 is an internally threaded aperture 29 which serves to threadedly receive the threaded portion 31 of a male carrier post 32. Post 32 is sized and configured to nest with a hollow female sleeve 33 with a cup 34 mounted at one end thereof to hold an indictor element 36 therein. It is to be noted the nesting male carrier post 32 and female sleeve 33 are so sized that indicator element 36 is urged toward and proximate the inner face of sight glass 28 well above the axis of fluid flow through chamber 22.

Figure 5:
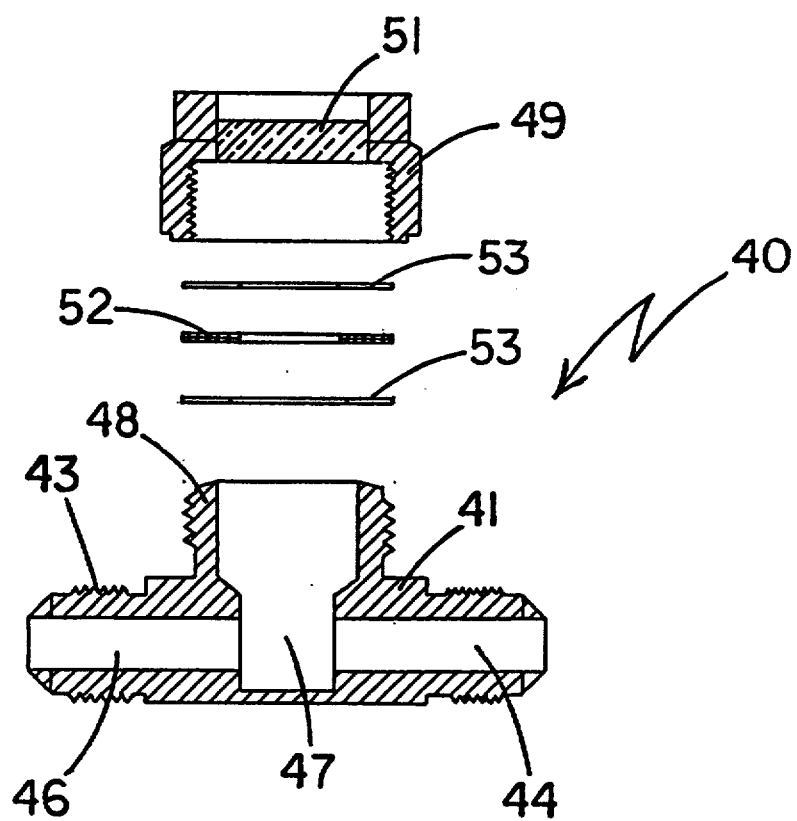

Referring to FIG. 5 of the drawings, still another prior art in-line sight housing assembly structure 40 is disclosed similar to that sold by the Henry Valve Co. of Melrose Park, Ill. In this structure, flow-through housing 41 is shown as including three threaded nipple portions with two spaced opposed externally threaded inlet and outlet nipples 42 and 43 including internal passages, 44 and 46, respectively communicating with fluid chamber 47 therebetween. The externally threaded nipples 42 and 43 serve to receive appropriately internally threaded fluid conduits (not shown).

A third, externally threaded nipple 48, defining a portion of fluid chamber 47 serves to receive an internally threaded sleeve 49 in which is mounted a sight glass 51. Mounted in sleeve 49 below and proximate the inner face of sight glass 51 is a color changing disc-like indicator ring 52 sandwiched between a pair of opposed gaskets 53.

From FIGS. 3-5, it again can be seen that prior art in-line sight indicators have included several comparatively complex and expensive to manufacture and assemble parts which are prone to fluid leakage at interfittings and which can give comparatively inaccurate indicator readings because of the comparatively removed location of the indicator from the fluid stream to be proximate the glass for observation.

Figure 1:
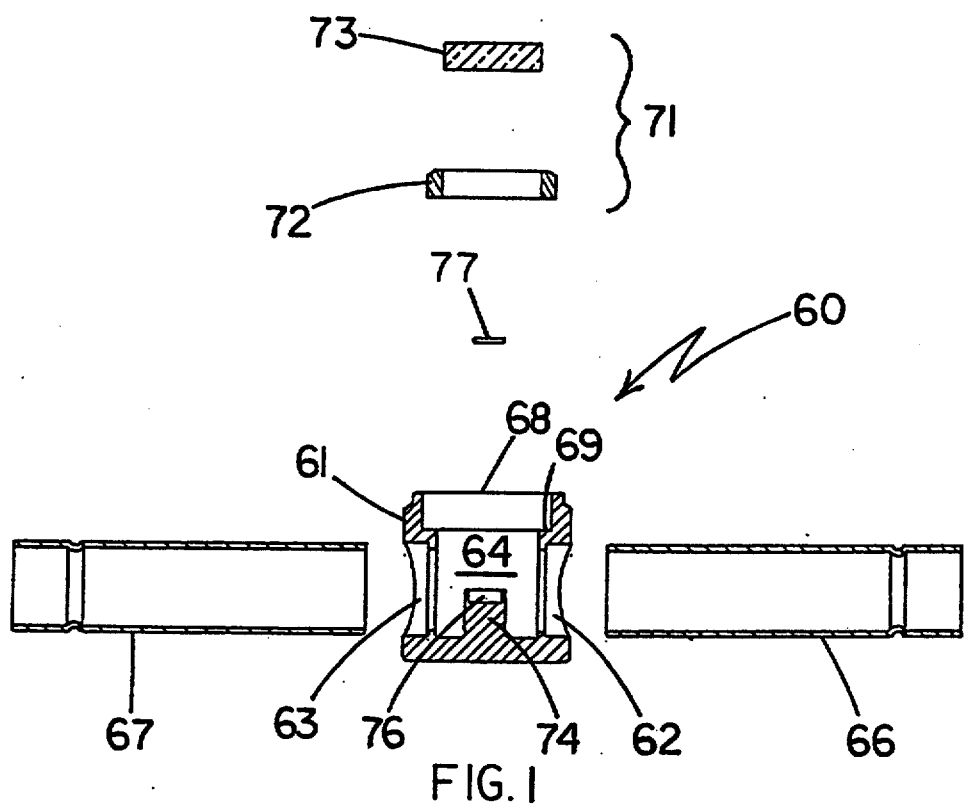
FIG. 1 is an exploded, cross-sectional side view of the novel in-line sight indicator.
Figure 2:
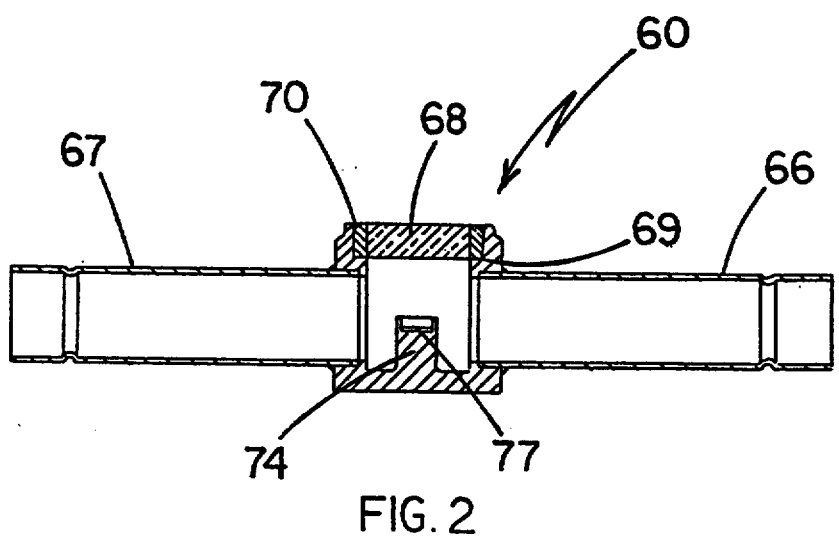
FIG. 2 is a cross-sectional side view of the assembled apparatus of FIG. 1.

In accordance with the present invention, an in-line sight indicator 60 is disclosed in FIG. 1 and of the drawings. This in-line sight indicator 60 can be hermetically sealed as an in-line part of a refrigeration system conduit to quickly, efficiently and accurately determine both the presence of refrigerant within the system and the presence of an undesirable level of water or moisture within the system refrigerant. The novel sight indicator 60 is comprised of a unitary housing 61 which can be formed from a suitable, corrosion resistant metal such as brass and is so manufactured to include opposed, aligned refrigerant flow inlet and outlet apertures communicating with internal fluid chamber 64. Each of the apertures 62 and 63 are sized and conformed to nestingly receive and have hermetically brazed thereto the opposed ends of copper refrigerant conduits 66 and 67 respectively.

It is to be noted that unitary brass housing 61 is provided in one wall portion thereof between spaced inlet and outlet aperture 62 and 63 with an indicator aperture 68 having a peripheral seat or lip 69 disposed in the wall portion surrounding indicator aperture 68. This seat 69 serves to nestingly receive a sight glass assembly 71 which can be sized and conformed to be hermetically sealed in sight aperture 68 of brass housing 61. In this regard, sight glass assembly 71 includes an advantageously tin plated steel band 72 which surrounds sight glass 73 of preselected thickness, which glass 73 is inserted in situ to be firmly and hermetically sealed within band 72. In accordance with one feature of the present invention, this fast, hermetic sealing of the sight glass 73 within band 72 is accomplished on suitable jigs which can be made of suitable materials such as ceramic and which are shaped to nestingly receive the plated steel bands 72. An appropriate, preselected glass material with appropriate coefficients of expansion and contraction with band 72 is then formed and inserted in situ into bands 72, treated in special ovens held at preselected temperatures, and the glass then allowed to harden in fast, hermetically sealed relation with the bands 72. Each sight glass assembly 71 is sized to have the outer peripheral side wall of band 72 abut the peripheral wall of defining aperture 68 with the lower edge of tin plated steel band 72 resting on lip or seat 69 and with the entire sight glass assembly 71 being hermetically sealed in aperture 68 with the edges of housing 61 being crimped over the upper edge of band 72 of sight glass assembly 71 and soldered as at 70 by a suitable heating step to hermetically seal the same.

It is to be noted that housing 61 further includes a longitudinally extending cylindrical, support arm 74, which can be hollow or solid and is formed from the inner peripheral wall of housing 61 to extend into the fluid chamber 64 defined by housing 61 to be substantially normal to the plane of the inner face of sight glass 73. Support arm 74 supports in an appropriate mounting recess 76 at the distal end thereof an indicator element 77, the arm 74 being so sized in length that the indicator element 77 is positioned in spaced relation to the inner face of sight glass 73 and in or substantially adjacent the flow axis of the opposed aligned refrigerant flow inlet and outlet apertures 62 and 63 respectively. The indicator element 77 is held firmly in place in support arm 74 by crimping the peripheral edge of the arm around recess 76. Advantageously element 77 is in the form of a wafer cut from a Whatman #3 filter paper which has been dip treated in a solution comprised of approximately 200 cc of distilled water and approximately 2 cc of 6N HCl to which has been added approximately 40 grams of $COCl_2$ $6H_2O$ and approximately 21 grams of $ZnCl_2$ drip hung and oven dried at approximately 45°–50° C. Since the indicator element 77 is supported in spaced relation to the inner face of sight glass 73, the aforedescribed hermetic sealing of the sight glass assembly does not harm spaced element 77.

The invention claimed is:

1. An in-line sight indicator for a fluid system comprising an indicator housing having a chamber with spaced flow inlet and outlet passages communicating therewith, each of said passages being connected to a fluid conduit;

visually transparent sight means disposed in the wall of said housing;

an indicator element support member disposed and positioned in said housing chamber in fixed position to support an indicator element in said housing chamber in spaced relation from said visually transparent sight means so as to be substantially in-line with and intermediate the flow of a fluid stream flowing from said inlet to said spaced outlet passage; and, an indicator element mounted on said support member, said element being chemically responsive to a fluid in said fluid system to provide a visible color change in the event of a preselected range of change in the fluid in said system.

2. The in-line sight indicator for the fluid system of claim 1, said several parts of said indicator being hermetically sealed from ambient.

3. The in-line sight indicator for the fluid system of claim 2 said visually transparent sight means including hermetic means to form the same in said housing for hermetic sealing therewith.

4. The in-line sight indicator for the fluid system of claim 1, said flow inlet and outlet passages in said housing chamber being axially aligned and oppositely spaced from each other.

5. The in-line sight indicator for the fluid system of claim 4, said indicator element mounted on said support member being so positioned that said indicator element mounted thereon is adjacent the flow axis between said inlet and outlet passages.

6. The in-line sight indicator for the fluid system of claim 1, said support member being a longitudinally extending tubular member formed from the inner peripheral wall of said housing chamber to extend substantially normal thereto and having a mounting recess at the distal end thereof to receive said indicator element.

7. The in-line sight indicator for the fluid system of claim 6, said distal end being crimped along the recess edge to retain said indicator element.

8. The in-line sight indicator for the fluid system of claim 6, said indicator element being a chemically treated wafer paper of preselected thickness and size to nest in said recess of said distal end of said support member.

9. The in-line sight indicator for the fluid system of claim 8, said wafer paper having been dip treated in a solution of approximately 200 cc of distilled water and approximately 2 cc of 6N HCl to which has been added approximately 40 grams of $CoCl_2$, $6H_2O$ and approximately 21 grams of $ZnCl_2$, drip hung and oven dried at approximately 45°–50° C.

10. The in-line sight indicator for the fluid system of claim 1, said visually transparent sight means including a metallic band member surrounding a sheet of glass formed in situ in said band on a jig to form a sight glass assembly said sight glass assembly nesting in sealed relation in an appropriately sized aperture in the peripheral wall of said housing chamber with a crimped edge of said aperture wall engaging said band edge in hermetically sealed relationship.

11. A hermetically sealed in-line sight indicator for a refrigeration system comprising:

a unitary brass housing including a chamber having opposed, aligned refrigerant flow inlet and outlet apertures in said housing communicating with said chamber, each of said apertures being sized and conformed to nestingly receive and have hermetically brazed thereto a copper refrigerant conduit end;

said unitary chamber defining housing further including a longitudinally extending cylindrical support arm drawn from the inner peripheral wall of said housing to extend substantially normally between said peripheral wall and the inner plane face of said sight glass, said support arm having a wafer element mounting recess at the distal end thereof positioned in fixed spaced relation to said sight glass intermediate the flow of a fluid stream and substantially adjacent the flow axis of said opposed, aligned refrigerant flow inlet and outlet apertures;

a wafer indicator element of preselected thickness, sized to nest in said mounting recess, said wafer element being a Whatman #3 paper having been dip treated in a solution comprised of approximately 200 cc of distilled water and approximately 2 cc of 6N HCl to which has been added approximately 40 grams of $CoCl_2$. $6H_2O$ and approximately 21 grams of $ZnCl_2$, drip hung and oven dried at approximately 45°–50° C.; and, said unitary brass housing having an aperture with a peripheral seat disposed in the wall thereof to nestingly receive a visually transparent sight glass assembly in hermetically sealed relation therein, said sight glass assembly including a tin-plated steel band surrounding a sheet of preselected thickness inserted into said band on a suitable jig to form said sight glass assembly, said sight glass assembly being sized to nest on said aperture to rest on said aperture seat with the outer peripheral face of said band being sized to abut said aperture wall to be hermetically sealed thereto with a crimped peripheral edge of said aperture wall engaging said band edge and soldered thereto in hermetically sealed relationship therewith.

* * * * *